United States Patent [19]

Pichardo

[11] Patent Number: 5,791,475
[45] Date of Patent: Aug. 11, 1998

[54] CARRYING CASE FOR A DENTAL HEAD

[75] Inventor: Penelope Pichardo, Queens, N.Y.

[73] Assignee: Columbia Dentoform Corp., Long Island City, N.Y.

[21] Appl. No.: 815,173

[22] Filed: Mar. 11, 1997

[51] Int. Cl.[6] ............................................. B65D 73/00
[52] U.S. Cl. ........................... 206/457; 206/575; 446/73; 446/75
[58] Field of Search .................... 206/457, 458, 206/541, 575; 446/72, 73, 75, 76; 434/263, 264

[56] References Cited

U.S. PATENT DOCUMENTS

| | | | |
|---|---|---|---|
| D. 308,320 | 6/1990 | Raucci | 206/457 |
| 4,015,327 | 4/1977 | McCarthy | 206/575 |
| 4,666,042 | 5/1987 | Dlott et al. | 446/73 |
| 4,820,231 | 4/1989 | Mikitka et al. | 446/73 |
| 5,074,417 | 12/1991 | Kenny | 446/73 |
| 5,163,863 | 11/1992 | Goldfarb et al. | 446/75 |
| 5,255,834 | 10/1993 | Bendersky | 206/457 |

OTHER PUBLICATIONS

Columbia Dentoform Corp. Catalog; 1987; pp: front cover, inside cover, 1,19,27, 28, 29,30 and back cover.
Kilgore International Inc. brochure; Not dated.
KaVo America Corp. Advertisement; Not dated.

*Primary Examiner*—David T. Fidei
*Attorney, Agent, or Firm*—Panitch Schwarze Jacobs & Nadel, P.C.

[57] ABSTRACT

A carrying case for a dental head includes a container sized to receive the dental head, a cover member connected to the container, and a socket mounted in the container. The cover member pivots between an open position and a closed position. The socket is adapted to receive a connector attached to the dental head and the case is preferably shaped to simulate a human torso. A handle is provided for carrying the case. Alternatively, straps connected to recessed clips may be used to carry the case.

23 Claims, 4 Drawing Sheets

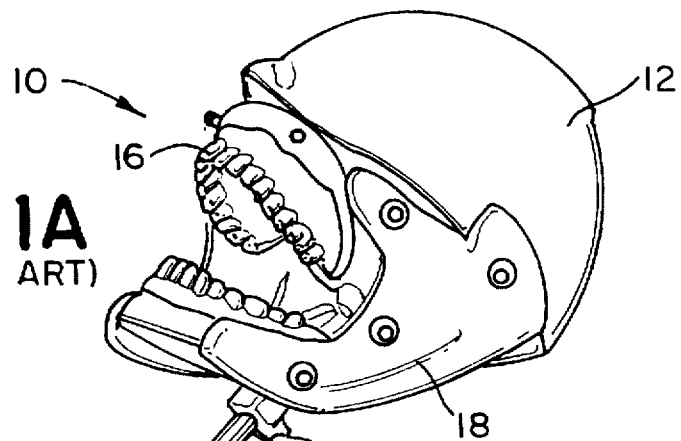
FIG. 1A (PRIOR ART)
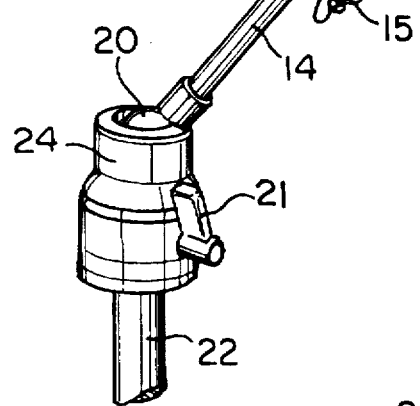
FIG. 1B (PRIOR ART)
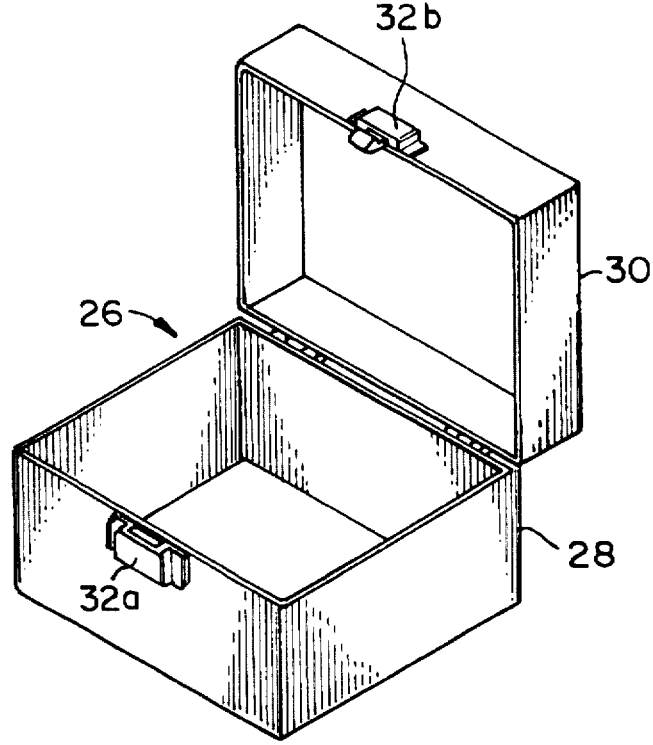
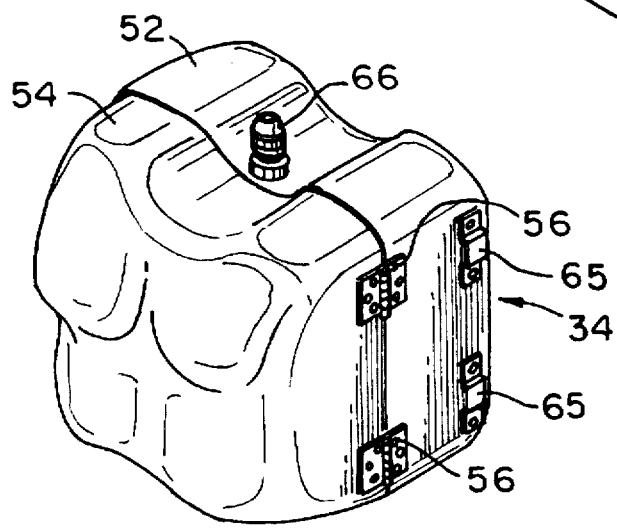
FIG. 3

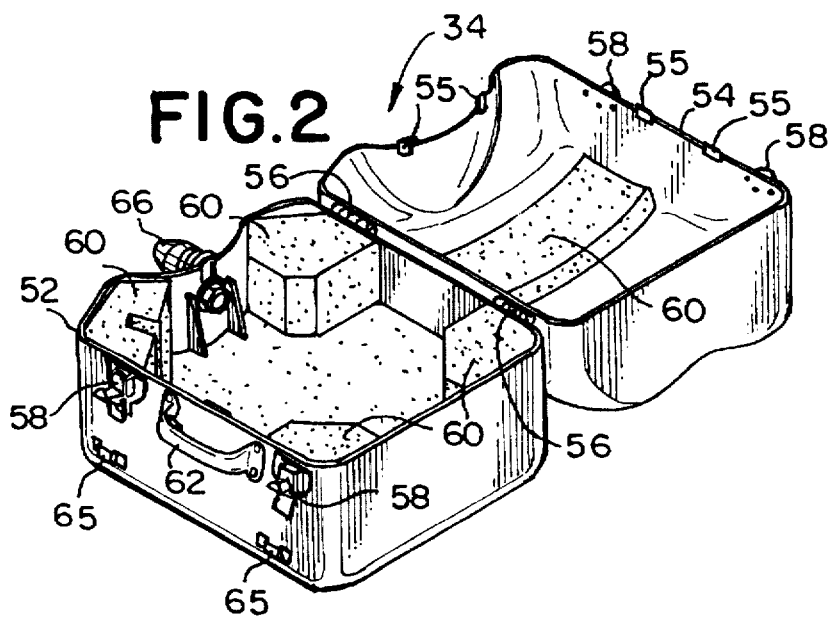
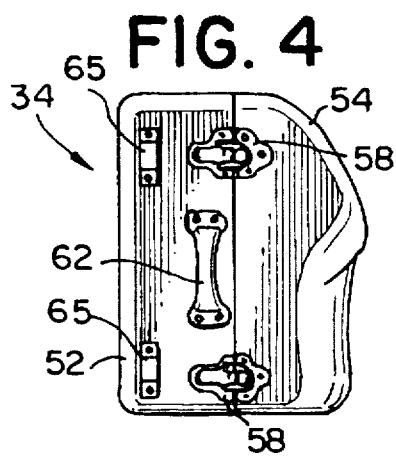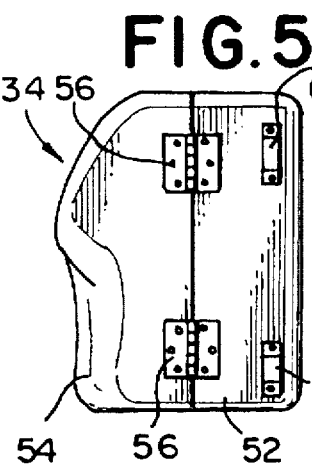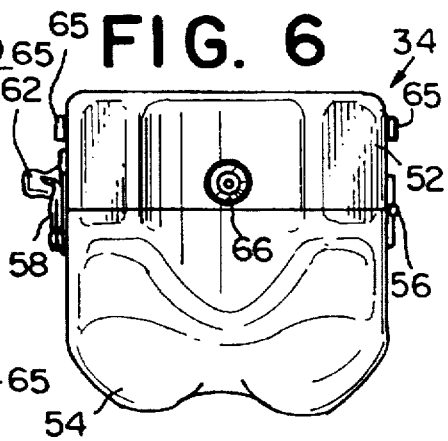
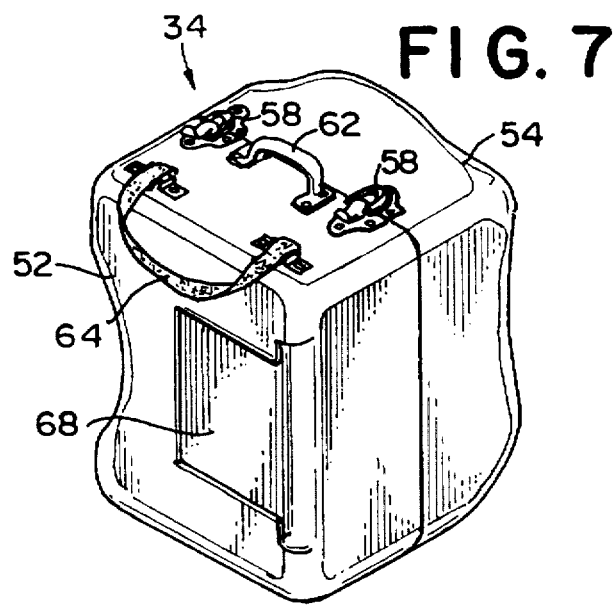

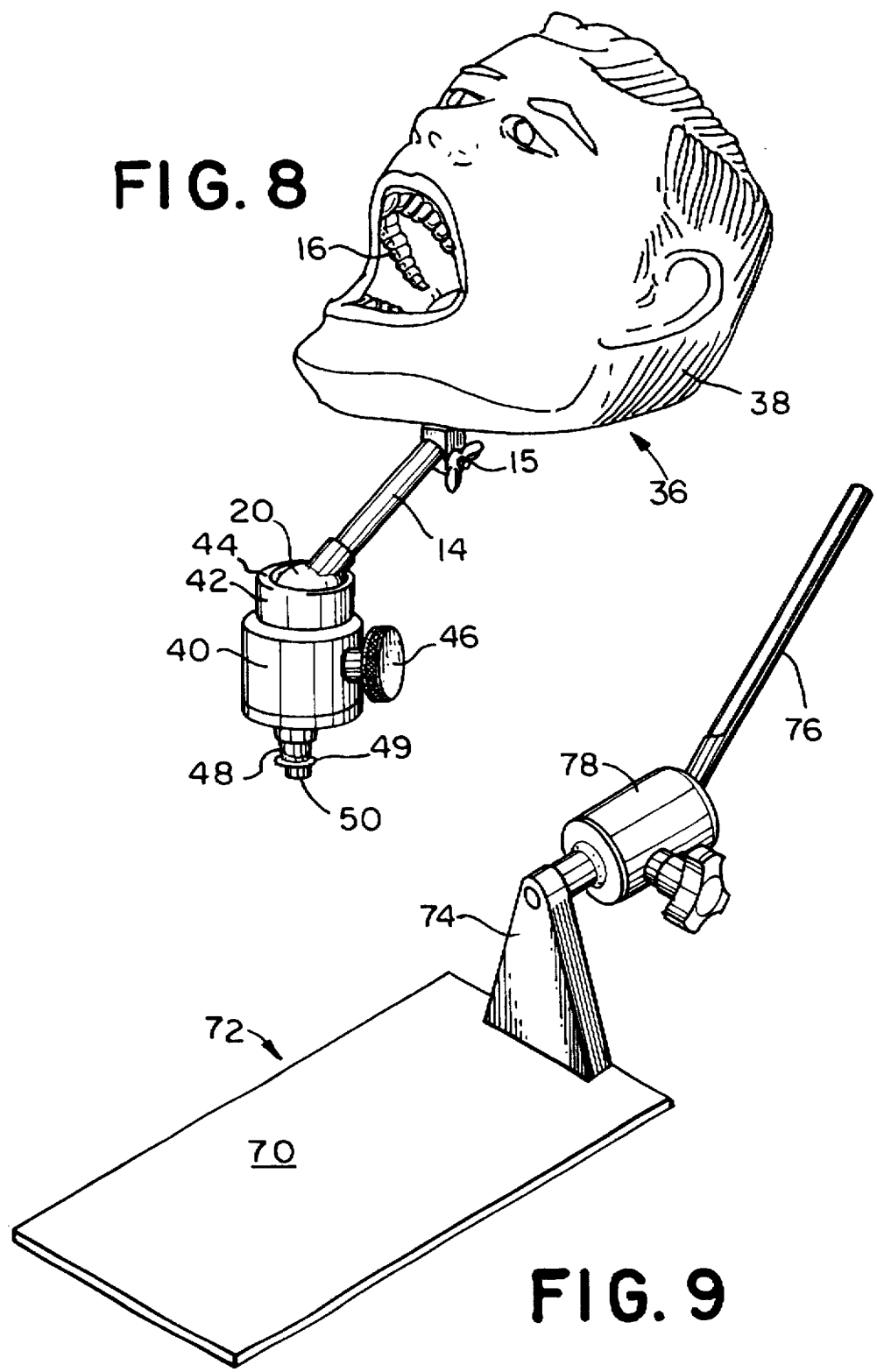

1

CARRYING CASE FOR A DENTAL HEAD

BACKGROUND OF THE INVENTION

The present invention relates to a carrying case for laboratory equipment and, more particularly, to a carrying case shaped like a human torso which includes a connector for attaching the dental head to the outside of the case.

Referring now to FIG. 1A, a conventional dental head 10 comprises a skull 12 having a rod 14 attached to an interior of the skull 12 and extending downward therefrom, and a dental form 16 connected to the rod 14. The head 10 may also include cheek plates 18 and may optionally be covered with a rubber or synthetic mask (not shown) in order to more closely simulate a human head. The rod 14 is connected to the skull 12 at its proximal end with a standard wing nut clamping arrangement 15. The rod 14 has a ball 20 connected at its distal end. The rod 14 is connected to a second rod 22 with the ball 20 of the first rod 14 being fitted within a socket 24 of the second rod 22 such that the first rod 14 is movable with respect to the second rod 22. The rod 14 can be locked in a stationary position with respect to the second rod 22 by clamping the socket 24 around the ball 20 using a lever 21 in a conventional manner. The second rod 22 is connectable to a lab bench or chair with a clamp in a conventional manner.

The dental head 10 thus described is popular with Dental Assistant and Dental Hygiene classes, as well as for Dentistry classes. The dental head 10 is also an expensive and delicate piece of equipment. Presently, the dental head 10 is hand carried by the rods 14, 22 to and from classes by students. This leaves the head 10 susceptible to being easily damaged by dropping or bumping other objects. Accordingly, it would be advantageous to have a carrying case for the dental head 10 which would protect the head 10 from being damaged.

Referring now to FIG. 1B, a prior art box 26 for a simulated or model skull is shown. Such model skulls are similar in size and shape to the dental head 10 except that the dental head 10 includes the rods 14, 22. The box 26 is entirely conventional in design and features, comprising a container 28 with a hinged lid 30. The box 26 is padded (not shown) to protect the skull and includes a locking latch 32a, 32b for maintaining the lid 30 in a closed position. Although the box 26 is suitable for storing and protecting a skull, the box 26 is awkward for a student to have to carry between classes. Moreover, the box 26 serves no purpose other than to store and protect the skull.

As can be seen from the foregoing description, there is a need in the dental education field for a carrying case for a dental head. It would be advantageous to have a box or container for a dental head which is easy to carry. It would also be advantageous to have a simulated torso which can be quickly connected and disconnected to a dental lab bench and to which a dental head may be quickly connected and disconnected during laboratory exercises, instruction, training, and testing. The present invention fulfills such a need and provides such advantages.

BRIEF SUMMARY OF THE INVENTION

Briefly stated, the present invention is a carrying case for a manikin head. The carrying case comprises a container for receiving the manikin head and a cover member being at least releasably attached to the container for movement between an open position and a closed position. A means for attaching the manikin head to one of the container and the cover member is also provided.

Another aspect of the present invention is directed to a carrying case for a dental head. The carrying case comprises a container sized to receive the dental head and a cover member being at least releasably connected to the container. The cover member has an open position allowing the head to be accessed and a closed position for enclosing the head within the container. A socket is mounted on one of the container and the cover member for receiving a connector attached to the dental head. A handle is connected to at least one of the container and the cover member for carrying the case.

Yet another aspect of the present invention is directed to a combination of a manikin head for dental teaching and a carrying case. The combination comprises a simulated head having a rod connected thereto and extending therefrom and a dental form connected to one of the rod and the simulated head, and a container sized to receive the manikin head. The container includes a cover member being at least releasably attached to the container for movement between an open position and a closed position, and means for attaching the manikin head by way of the rod to one of the container and the cover member.

BRIEF DESCRIPTION OF THE SEVERAL VIEWS OF THE DRAWINGS

The foregoing summary, as well as the following detailed description of the presently preferred embodiment of the invention, will be better understood when read in conjunction with the appended drawings. For the purpose of illustrating the invention, there is shown in the drawings an embodiment which is presently preferred. It should be understood, however, that the present invention is not limited to the particular arrangement and instrumentalities shown. In the drawings:

FIG. 1A is a perspective view of a prior art dental head;

FIG. 1B is a perspective view of a prior art box for a simulated skull;

FIG. 2 is a perspective view of a carrying case for a dental head in accordance with the present invention in an open position;

FIG. 3 is a front elevational view of the carrying case shown in FIG. 2 in a closed position;

FIG. 4 is a left side elevational view of the carrying case shown in FIG. 3;

FIG. 5 is a right side elevational view of the carrying case shown in FIG. 3;

FIG. 6 is top plan view of the carrying case shown in FIG. 3;

FIG. 7 is rear elevational view of the carrying case shown in FIG. 3;

FIG. 8 is a perspective view of a dental head with a quick release connector in accordance with the present invention;

FIG. 9 is a perspective view of a mounting unit in accordance with the present invention.

DETAILED DESCRIPTION OF THE INVENTION

Figure 10:
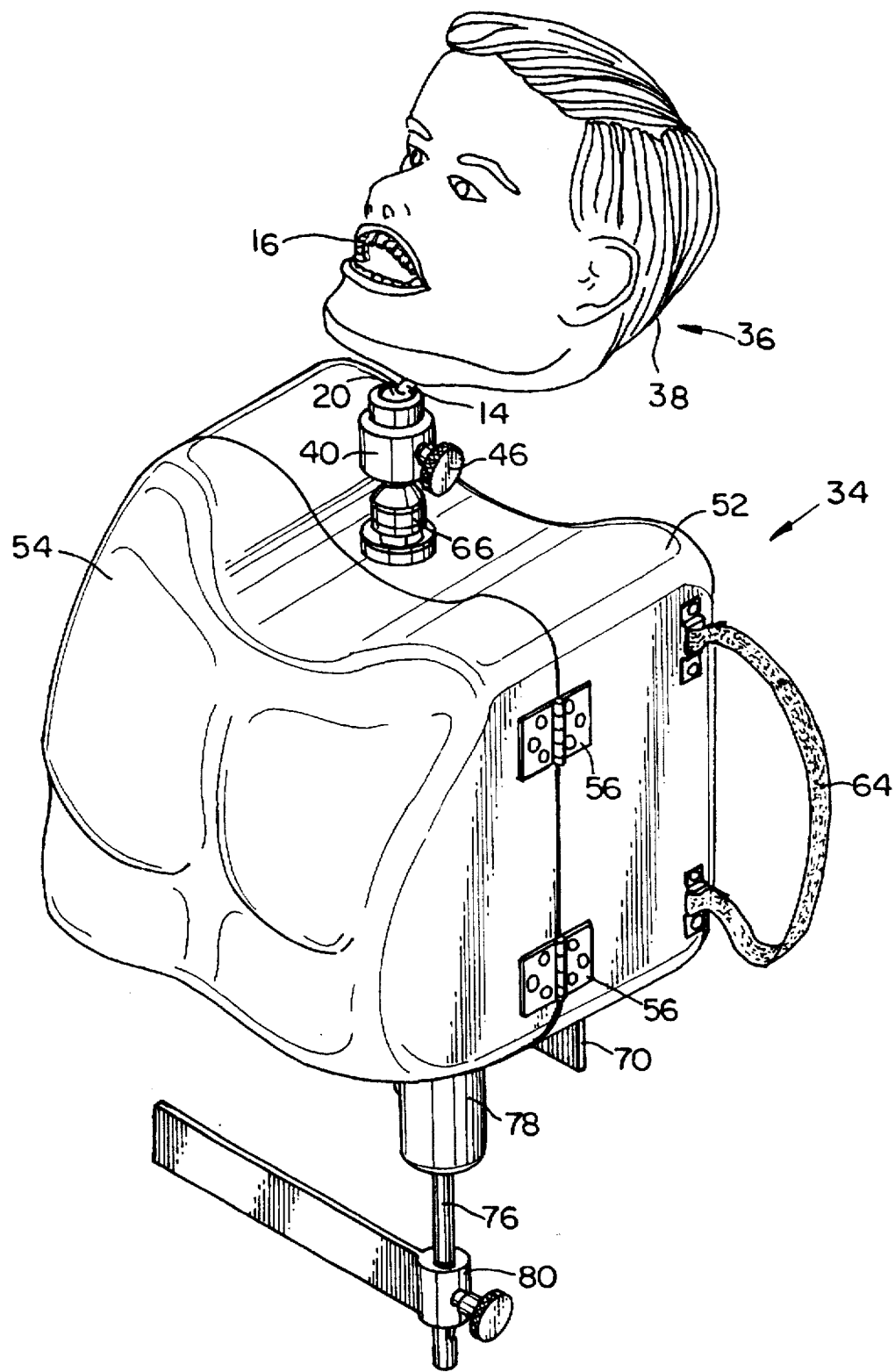
FIG. 10 is a front elevational view of the dental head shown in FIG. 8 and the mounting unit shown in FIG. 9 attached to the carrying case of the present invention.

Certain terminology is used in the following description for convenience only, and is not limiting. The words "right," "left,", "top", "bottom", "lower" and "upper" designate directions in the drawings to which reference is made. The words "inwardly" and "outwardly" refer to directions toward and away from, respectively, the geometric center of the carrying case and designated parts thereof. The terminology includes the words above specifically mentioned, derivatives thereof and words of similar import.

The present invention is directed to a carrying case for a manikin or dental head which is preferably shaped like a human torso. The carrying case includes an external connector on which the dental head can be mounted such that the carrying case may also be used as a simulated human torso. Thus, in addition to being a convenient carrying case, when the head is attached to the case, the head with simulated torso can be used in a dental educational program, such as dentistry, hygiene, and dental assisting. The head and simulated torso afford the dental student most of the life-like restrictions present in a live clinical setting. The carrying case also includes a means for connecting the case to a laboratory bench, a chair, or a table top.

Referring to the drawings in detail, wherein like numerals indicate like elements throughout, there is shown in FIGS. 2 through 7 a carrying case 34 for a manikin or dental head of the type well known to those of ordinary skill in the art and used by dentistry students, such as the dental head 10. Although the carrying case 34 is suitable for carrying the dental head 10, it is presently preferred to use a modified dental head with the carrying case 34.

FIG. 8 shows a modified dental head 36 for use with the carrying case 34. Many of the elements of the modified dental head 36 shown in FIG. 8 are the same as the elements used in the conventional dental head 10 described above in connection with FIG. 1. Accordingly, like numerals indicate the identical elements in FIGS. 1 and 8. That is, the modified dental head 36 includes a skull (not shown) having a rod 14 attached to an interior of the skull and extending downward therefrom, and a dental form 16 connected to the rod 14. The head 36 may also include optional cheek plates (not shown) and an optional rubber or synthetic mask 38 in order to closely simulate a human head. The rod 14 has a ball 20 connected at its distal end. The rod 14 is connected to a connector 40, with the ball 20 of the first rod 14 being fitted within a socket 42 on a first end 44 of the connector 40 such that the first rod 14 is movable with respect to the connector 40. A knob 46 on the connector 40 is provided for adjusting the ball-joint in order to fix the ball 20 with respect to the socket 42 so that the head 36 can be maintained in a desired stationary position.

The connector 40 also includes a male quick connect member 48 located at a second end 50 of the connector 40 opposite the connector first end 44. The quick connect member 48 includes a lip 49 around a circumference thereof. The quick connect member 48 and the lip 49 are adapted (sized and shaped) to be received within a hole of a quick connector, as will be discussed in more detail below.

Referring again to FIGS. 2 through 7, the carrying case 34 basically comprises a container 52 for receiving the manikin or dental head 36 and a cover member 54 attached to the container 52. The container 52 is sized and shaped to receive the dental head 36. Preferably, the head 36 fits reasonably snugly within the container 52 so that the head 36 does not move around too much when positioned or placed in the container 52, as described in more detail hereinafter.

The cover member 54 functions like a lid and is movable between an open position and a closed position. In the presently preferred embodiment, the cover member 54 is attached to the container with at least one hinge, and preferably with a pair of hinges 56 in a conventional manner.

Although the cover member 54 is hinged to the container 52 in a conventional manner with the pair of hinges 56 being disposed in spaced relation to each other on an outer edge of a wall of the container 52, it will be understood by those of ordinary skill in the art that the cover member 54 may be attached to the container 52 in a variety of ways. For instance, the cover member 54 could include a pin molded into it which fits within opposing recesses on the container, such that the cover member 54 pivots between the open position and the closed position. Alternatively, the cover member 54 could be removable (i.e. releasably attachable to the container 52), as opposed to hinged.

While in the present embodiment, it is preferred that the cover member 54 be movably attached to the container 52 with external hinges, it is understood by those of ordinary skill in the art from this disclosure that the present invention is not limited to any particular manner of movably securing cover member 54 to the container 52. For instance, the cover member 54 could be a flexible material which is zippered or snapped in the closed position, or secured with a simple interlock mechanism or through the use of suitable hook-and-loop material.

The container 52 and/or the cover member 54 may also include a means for aligning the cover member 54 with the container 52 in the closed position. In the presently preferred embodiment, the alignment means comprises one or more protrusions or stand-offs 55 located along an inner edge of the rim of the cover member 54 and along an inner edge of the rim of the container 52. The stand-offs 55 project outwardly from the inner edge of the rim of the cover member 54 for a very small distance, such as about 0.185 inches. In the closed position, the stand-offs fit on the inside edge of the container 52 and the cover member 54. If one or more of the stand-offs 55 is not located within the container 52 and the cover member 54 when cover member 54 is in the closed position, then the cover member 54 is not properly aligned with the container 52. The stand-offs 55 may be an integral part of the container 52 and/or the cover member 54 or the stand-offs 55 may be attached to the container 52 and/or the cover member 54, as will be understood by those of ordinary skill in the art.

In the open position, the dental head 36 may be placed within or removed from the container 52. Preferably, the cover member 54 pivots at least 90 degrees, and more preferably, the cover member 54 pivots at least 180 degrees, thereby allowing a person to easily access the interior of the container 52. In the closed position, the cover member 54 mates with the edges of the walls of the container 52. As previously discussed, when the cover member 54 is in the closed position, the dental head 36 is securely fit within the container 52 so that the head 36 is not inadvertently damaged if the container 52 is bumped or jarred.

In order to better protect the dental head 36 when the head is positioned within the container 52, a padding means may be provided. In the presently preferred embodiment, conventional foam type padding 60 is disposed within the container 52 and the cover member 54 for protecting the dental head 36 from damage when the head 36 is stored within the container 52 and the cover member 54 is in the closed position. The padding 60 may be located at each of the corner areas of the container 54 (or around the inner sides of the container 54 if the container 54 does not include corners) and also in the center of the container 54. The padding 60 is preferably attached to the container 52 and the cover member 54 with an adhesive, such as a glue, as is known by those of ordinary skill in the art. The padding 60 may also be located in complementary locations of the cover member 54. The amount and placement of the padding 60 is dictated by the function of providing a snug fit to protect the dental head 36. The padding 60 could also be removable, and include hook and loop type material (with hook and loop type material being attached within the container 52 and the cover member 54) so that the amount and placement of the padding 60 can be defined by the user.

Means other than padding may also be used for protecting the head 36 when the head 36 is positioned within the container 52. For instance, an attachment means, such as a quick connector assembly (not shown), could be mounted inside of the container 52 to support the head 36 therein. Other securement means are known by those of ordinary skill in the art.

The cover member 54 is maintained in the closed position with a pair of conventional buckles 58, such as the type of buckles used to maintain a suitcase in a closed position. The buckles 58 may also include a locking mechanism (not shown), such as a combination or key type locking mechanism, as is known to those of ordinary skill in the art. The buckles 58 may be screwed, bolted, riveted, glued, or otherwise attached to the container 52 and to the lid 54, as is known in the art, or the buckles 58 could be integral with or built into the container 52 and the lid 54. In the presently preferred embodiment, two sets of the buckles 58 are disposed in spaced relation along a side wall of the container 52 and a side edge of the cover member 54 which is opposite the side wall of the container 52 to which the hinges 56 are attached. Of course, the buckles 58 could be located elsewhere along the edge of the container 52, such as one buckle 58 on each of the walls of the container 52 excepting the wall having the hinges 56.

The carrying case 34 also preferably includes a handle 62 connected to one of the container 52 and the cover member 54. Any type of handle 62 may be used with the present invention. The handle 62 is preferably secured to the container 52 or the cover member 54 in any suitable manner, such as with a screw or an adhesive, in a manner well understood by those of ordinary skill in the art. Handles are well known to those of ordinary skill in the art, thus a detailed description of the handle 62 is not required to understand the present invention. Suffice it to say that the handle 62 allows a person to easily hold and carry the carrying case 34.

The carrying case 34 may also include at least one strap 64 connected to one or both of the container 52 and the cover member 54. Accordingly, either the container 52 and the cover member 54 may include loops 65 for receiving the ends of the strap, respectively. The strap 64 may be the type of strap used on a carry-on type bag or two straps may be used so that the case 34 may be carried like a backpack. Either way, the purpose of the strap 64 is to facilitate carrying the case 34. The strap 64 may comprise nylon, leather or any other material. Like the handle 62, straps for carrying cases are well known to those of ordinary skill in the art and accordingly, further discussion of the strap 64 is not required for a complete understanding of the present invention.

Referring also now to FIG. 10, according to the present invention, the carrying case 34 further comprises a means for attaching the manikin head 36 to one of the container 52 and the cover member 54. That is, when the head 36 is removed from within the container 52, the head 36 may be attached to the outside of the container 52, so that the head 36 may be used by a student, for example performing laboratory exercises. In addition, the container 52 and the cover member 54 are shaped to simulate a human torso. In this manner, in a laboratory or classroom environment, the carrying case 34 and the head 36 simulate a portion of a human, namely the torso (i.e. shoulders and chest) and a head, to thereby closely approximate a live clinical setting. Thus, the carrying case 34 functions as both a carrying case and as a support for the dental head 36.

In the presently preferred embodiment, the means for attaching the head 36 to the carrying case 34 comprises a quick connect coupling in the form of a quick connect socket 66 for receiving the male quick connect member 48 of the dental head 36. That is, the male quick connect member 48 is releasably positioned within the socket 66, with the lip 49 of the male member 48 being releasably engaged beneath a pair of spring mounted bars (not shown) located within the quick connect socket 66. The socket 66 further includes a threaded bolt for releasably securing the quick connect member 48 therein. The male quick connect member 48 may also include a protrusion (not shown) extending generally perpendicular thereto which fits within a slot (not shown) located in an inner edge or side of the socket 66 for aligning the male member 48 and the socket 66. It is preferred that the connector 40 and the connector socket 66 comprise a generally standard connector assembly of a type well known to those of ordinary skill in the art in which the connector 40 is readily received and locked within the socket 66, and may be easily unlocked and removed from the socket 66.

The socket 66 is preferably strongly anchored to the container 52. However, the socket 66 could be attached to the cover member 54. Since such connector assemblies 40, 66 are well understood by those of ordinary skill in the art, further description thereof is omitted for purposes of brevity and convenience only, and is not limiting. However, it is also understood by those of ordinary skill in the art that the connector 40 and the quick connector socket 66 can take other forms. For instance, the connector 40 could include a receiving hole (not shown) and the connector socket 66 could include a protrusion (not shown) for being received within the receiving hole. Other connection methods are also known to those of ordinary skill in the art and may be substituted without departing from the scope of the invention. FIG. 10 shows the head 36 attached to the container 52 by way of the quick connect member 48 and the quick connect socket 66.

Referring now to FIGS. 7, 9 and 10, the carrying case 34 further preferably comprises a means for attaching the case 34 to a laboratory bench, such as a laboratory bench having a No. M-UNC-9 bench mount available from Columbia Dentoform Corp. of Long Island City, N.Y. In the presently preferred embodiment, the laboratory bench attachment means comprises a sleeve or receiving slot 68 in an outer surface of the container 52 which is sized and shaped to receive a complementary shaped paddle 70 of a mounting device 72. Alternatively, the receiving slot 68 could be located in the cover member 54. The mounting device 72 comprises a paddle 70 which is preferably generally rectangular shaped having a flange 74 attached at one end. A rod 76 is connected to the flange 74 via a ball and socket connector 78.

When the paddle 70 of the mounting device 72 is received within the receiving slot 68 of the case 34, the rod 76 extends vertically downward from the case 34 and may be received within a conventional connector 80 of a bench mount device, such as the aforementioned Columbia Dentoform Corp. M-UNC-9 bench mount device. The ball and socket connector 78 allows the carrying case 34 and the head 36 to be moved with respect to the mounting device 80 so that a user or student may angle or tilt the "body" and "head" of the simulated person as desired.

In the preferred embodiment, the container 52 and the cover member 54, except for the buckles 58 and hinges 56, is constructed of a high-strength, lightweight material, such as a polymeric material. The container 52 and the cover member 54 may be constructed, for instance, of a polymeric material using a rotational molding method, as is known to those of ordinary skill in the art. Rotational molding allows the polymeric material to be shaped such that the container 52 and the cover member 54 simulate a human torso, including for example, a collar and pectoral muscles. However, it is understood by those of ordinary skill in the art that the present invention is not limited to being constructed of any particular method or type of material, and that other materials could be used without departing from the spirit and scope of the invention. For instance, the container 52 and the cover member 54 could be constructed of a high strength metal or metal alloy, which is also preferably light weight, such as stainless steel. Alternatively, the container 52 may be constructed of a flexible material, such as a fabric, and include a rigid internal frame (not shown) for protecting the head 36 when the head 36 is stored within the container 52 and for supporting the head 36 when the head 36 is mounted on the case 34 by way of the attaching means. For instance, a conventional backpack (not shown) fitted with a special internal frame and an external connector for mounting the head 36 to the backpack is within the scope of the present invention.

It will be appreciated by those skilled in the art that changes could be made to the embodiments described above without departing from the broad inventive concept thereof. It is understood, therefore, that this invention is not limited to the particular embodiment disclosed, but it is intended to cover modifications within the spirit and scope of the present invention as defined by the appended claims.

I claim:

1. A carrying case for a manikin head, the case comprising:
   a container for receiving the manikin head;
   a cover member being at least releasably attached to the container for movement between an open position and a closed position; and
   a quick connect coupling releasably attaching the manikin head to one of the container and the cover member.

2. The carrying case of claim 1 wherein said quick connect coupling comprises a quick connect socket for receiving a connector attached to the manikin head.

3. The carrying case of claim 2 wherein the container and the cover member are constructed of a semi-rigid polymeric material and wherein the manikin head is supported by the container and the cover member when the connector is received within the quick connect socket.

4. The carrying case of claim 1 wherein the cover member is attached to the container with at least one hinge.

5. The carrying case of claim 1 further comprising a handle connected to one of the container and the cover member.

6. The carrying case of claim 1 further comprising at least one strap connected to one of the container and the cover member.

7. The carrying case of claim 1 wherein the container and the cover member are shaped to simulate a human torso.

8. The carrying case of claim 1 further comprising a sleeve located on one of the container or the cover member for receiving a paddle, wherein the paddle includes a rod for attaching the paddle to a mounting device.

9. The carrying case of claim 1 further comprising padding located within the container for protecting the manikin head from damage when the manikin head is stored within the container and the cover member is in the closed position.

10. The carrying case of claim 1 further comprising at least one buckle for securing the cover member in the closed position.

11. A combination of a manikin head for dental teaching and a carrying case, the combination comprising:
    a simulated head;
    a rod connected to the head and extending therefrom;
    a dental form connected to one of the rod and simulated head;
    a container sized to receive the manikin head;
    a cover member being at least releasably attached to the container for movement between an open position and a closed position; and
    means for attaching the manikin head by way of the rod to one of the container and the cover member.

12. The combination of claim 11 further comprising a ball joint connected to a distal end of the rod for allowing the rod to move with respect to the ball joint and a connector attached to the ball joint for being attached to one of the container and the cover member.

13. The combination of claim 12 wherein the attaching means comprises a quick connect socket for receiving the connector.

14. The combination of claim 11 wherein the container includes a sleeve for receiving a paddle adapted to be connected to a lab bench.

15. The combination of claim 11 wherein the container and the cover member are shaped to simulate a human torso.

16. A carrying case for a dental head, the carrying case comprising:
    a container sized to receive the dental head;
    a cover member being at least releasably connected to the container, the cover member having an open position allowing the head to be accessed and a closed position for enclosing the head within the container;
    a socket mounted on one of the container and the cover member for receiving a connector attached to the dental head; and
    a handle connected to one of the container and the cover member for carrying the case.

17. The carrying case of claim 16 wherein the container and cover member are contoured to simulate a human torso.

18. The carrying case of claim 16 further comprising a sleeve located within an outer surface of the container for receiving a paddle, wherein the paddle includes a means for being mounted to a dental lab bench.

19. The carrying case of claim 16 wherein the cover member is attached to the container with at least one hinge.

20. The carrying case of claim 19 further comprising at least one buckle for maintaining the cover member in the closed position.

21. The carrying case of claim 20 further comprising a strap and means for securing the strap to the container.

22. The carrying case of claim 21 wherein said strap securing means comprises at least one recessed clip integral with the container.

23. The carrying case of claim 17 wherein the container and the cover member are constructed of a polymeric material.

* * * * *